May 18, 1965 N. K. PERKINS 3,184,719

MOLDED CORE PLANE

Filed Dec. 24, 1958 3 Sheets-Sheet 1

INVENTOR
NORWOOD K. PERKINS

BY John W Armbruster
ATTORNEY

May 18, 1965 N. K. PERKINS 3,184,719

MOLDED CORE PLANE

Filed Dec. 24, 1958 3 Sheets-Sheet 3

United States Patent Office 3,184,719
Patented May 18, 1965

1 2

3,184,719

MOLDED CORE PLANE

Norwood K. Perkins, Lexington, Ky., assignor to International Business Machines Corporation, New York, N.Y., a corporation of New York Filed Dec. 24, 1958, Ser. No. 782,925
7 Claims. (Cl. 340—174)

This invention relates to plastic molding and printed circuit techniques as applied to the fabrication of magnetic core memory arrays and is directed more particularly to an arrangement adapted for automatic production of such arrays.

The invention is concerned with a method of providing circuitry and windings for toroidal magnetic memory cores by means of molds which are designed for shaping injected plastic insulation material as a holder board or plate with grooves to and through the core openings. The cores are first assembled inside a lower mold on cross slotted and shouldered pins and registered therein by a temporary mask or registration plate. The loose cores are vibrated into place in annular openings between the mask and the extending pins and held thereon by suction or vacuum. Next, the temporary plate is removed and a top mold plate is assembled over the cores, said top plate having ribs on its underside leading to the four solid sides of the pins through the center of each core. Both the upper and lower mold sections have ribs for grooving the inserted plastic powder or soft compound which is forced into the mold with heat and pressure to encapsulate or enclose all the cores but leave conductor grooves on the holder board and four segmental holes shaped by said slotted pins inside each core. After removal from the mold, the plastic panel or board containing the cores is covered and plated with conductive metal all over including the grooves and the insides of the core holes. Then the board is moved through a double disk grinder to take off all outer plating and leave only the channel plating including the connections through the four core holes. In this fashion, a complete core array is made economically by molding and printed circuit technique to not only hold the cores in vertical and horizontal array positions but also furnish a plurality of windings therethrough for full control over storage and memory operation control.

Magnetic cores having rectangular hysteresis characteristics are employed for memory purposes and are conventionally arranged in rows and columns with wire windings passing through the cores in each individual row and in each individual column to be used for selection of a particular core in a selected plane or group of planes by coincident energization of single column and row windings. Each single plane is provided with a third winding comprising a sense winding that links each core of the plane in one or the other polarity sense or in alternate sense or with half the cores in one sense and half in the other sense so as to balance out the effects of those cores that are only partially excited by one or the other winding during coincident energization of a row and column winding to select a particular core for interrogation. In a three dimensional array, each plane of cores is also provided with a fourth winding conventionally termed the inhibit winding that is selectively pulsed during a write interval to prevent the combined effects of the magnetomotive forces provided by the row and column windings from causing a change in remanence state of the core in that plane when writing or rewriting information or binary characters in the array. In this instance of application, like positioned cores in the several stacked two dimensional array planes, comprise bits of a binary word and the similar row and column windings of each bit plane are series connected so that on energization of these windings in coincidence, the core in each plane linked thereby would attain a one representing remanence state unless inhibited by pulsing the fourth winding individual to that plane.

Heretofore, magnetic core arrays of the type described have been assembled manually with the windings threaded through the cores and providing support therefore in the completed matrix. This means of assembly has become increasingly time consuming and expensive since arrays of greater capacity requiring a large number of corres are used, with the tendency being toward increasing bit capacity and use of smaller sized cores.

The present improvement contemplates a potting or encapsulating process yielding printed circuit conductors and core windings wherein the assembly of a memory core array is produced rapidly and automatically in an economical high speed process. The method is based upon the availability of plastic potting compound which is subject to flowing and injection into a mold to not only encapsulate small core formations but also provide openings through one or more central openings in the cores, said openings being receptive to sprayed underlying preliminary or complete films such as graphite or liquidfied silver or copper chemical spray materials which form the preliminary coating for possible subsequent build up by plating with copper, nickel or other conductive material to form permanent conductor lines in the grooves and openings formed below the surface of the molded plastic core receiving plate or board. It is to be understood that such conducting lines on the board are present on both sides of the board and extend to the edges of one or more sides of both faces of the board whereat terminal formations may be formed by reception of soldered or clamped lead wires, common vertical rods or bars, or other terminal formations which extend into machine proper for reception of the impulses which control the reading, writing and inhibiting controls over the core array.

An object of the invention is to provide a method for assembling a magnetic core array obviating the need for threading wire conductors through the cores by hand.

Another object of the invention is to provide a molding process for formation of magnetic core arrays, said process being adapted for rapid automatic and economical operation of complete array fabrication.

Another object of the invention is to provide an improved method of embodying printed circuit windings in a magnetic core matrix.

A further object of the invention is to provide a process combining the best features of plastic molding operation with additive printed circuit techniques for the purpose of providing an improved automatically formed magnetic core matrix.

A still further object of the invention is the provision of a novel form of molding structure designed to encapsulate electronic components in such a fashion as to render them receptive to complete wiring and connection by printed circuit techniques without need of any subsequent connections by other operations.

Other objects of the invention will be pointed out in the following description and claims and illustrations in the accompanying drawings, which disclose, by way of example, the principle of the invention and the best mode, which has been contemplated, of applying that principle.

Figure 6:
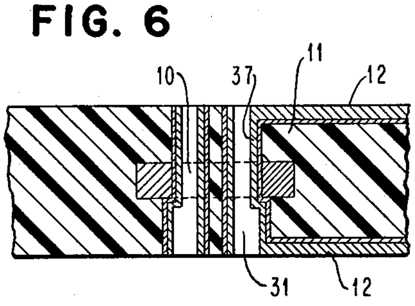

FIG. 6 shows the appearance of a part of the completed plate or board after a grinding operation whereby the conductive material on both faces of the board is removed to leave behind only that conductive matter or metal which is deposited in the grooves and through the core as windings, and conductors leading to such windings, from the terminal edges of the board where control impulses may be received or delivered.

Figures 7, 8:
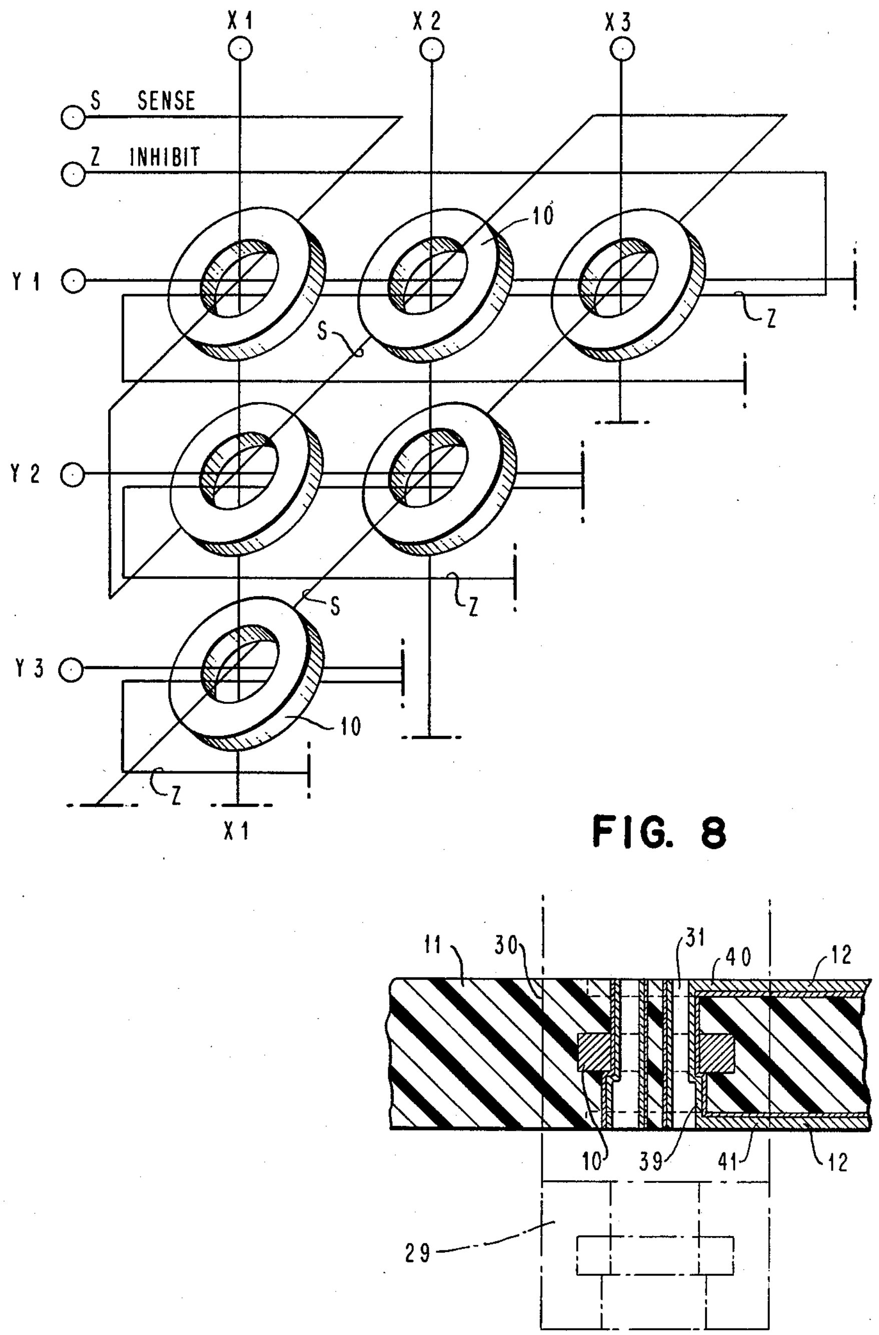

FIG. 7 is a diagrammatic perspective view showing a number of cores in an array and the fashion in which the windings are directed therethrough.

FIG. 8 illustrates the manner in which a defective core may be punched, cut or drilled out of the encapsulating board and another core block inserted with the proper matching conductors in grooves and core winding formations to mate with the remainder of the board so that a completely operative array is reconstituted without scrapping an entire board.

Figure 9:
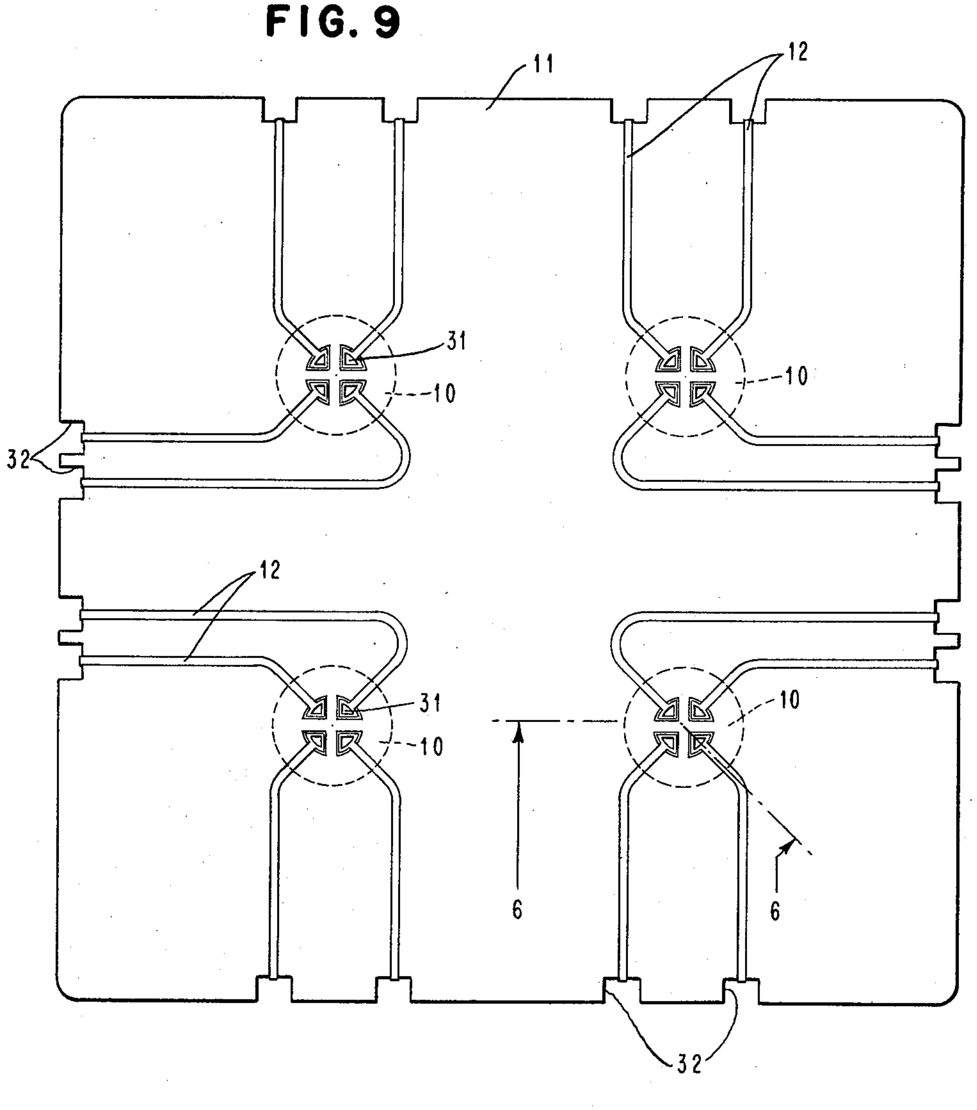

FIG. 9 is a plan view showing a simple set of cores embedded in the molded panel with four sets of conducting lines or windings plated therethrough, certain of said lines extending to the edges of the plastic board to modular notches for stacking within common vertical rods or bus bars.

A single plane of a typical three dimensional array of magnetic cores is shown in FIG. 7 where toroidal cores 10 are shown arranged in rows and columns, as aforementioned, and linked by column windings X and row windings Y. Such an array is illustrated, for example, in an article entitled "Ferrites Speed Digital Computers" by D. R. Brown and E. Albers-Schoenberg, appearing on page 146 of Electronics magazine, issue of April 1953, and described and claimed in the application of E. W. Bauer and M. K. Haynes, Serial No. 443,284, filed July 14, 1954, and now U.S. Patent No. 2,889,540, issued June 2, 1959, which application is assigned to a common assignee.

In such an arrangement a particular core is selected for reading by the simultaneous energization of that X and that Y selection line or winding that embraces that particular core. The current pulse on each line provides a magnetomotive force to each core that it links, which force is less than the coercive force, and the single core energized by both windings then receives double the force. The selected core is thus caused to change from a binary one representing remanence state to a zero remanence state, if it held a binary one representation, and this flux change develops an induced voltage in a sense winding S indicating this fact. If a zero remanence state had been stored in the interrogated core, little flux change takes place and the sense winding signal is of low value so that storage of ones and zeros may be distinguished. Writing or storing a binary one state is similar to a reading operation but with the sense of the X and Y drive pulses reversed to cause the selected core located at the winding intersection to change from a zero remanence state to the one remanence state. This change also induces a voltage in the sense winding S but it is disregarded at write time by means of a gate (not shown). Writing a zero may be accomplished in a two dimensional array by failure to apply the X and Y write direction pulses in coincidence and in a three dimensional array, where the X and Y lines link like positioned cores of plural planes to define words of plural bits, the X and Y line pulses may be applied in coincidence but their effect counteracted in selected planes, where zeros are desired, by pulsing an inhibit winding Z in that bit plane. The X, Y, S and Z windings are shown in FIG. 7 and it is to be noted that the inhibit winding links all the cores in the same sense while the sense winding S links the cores in alternate diagonals in an opposite sense. The winding pattern of the sense winding as shown is such as to provide a bidirectional output signal but, since those cores that are linked only by the selected X or selected Y winding alone and are partially excited contribute some output signal on interrogation, the effects of non-selected cores tend to cancel one another. Many other sense winding configurations are feasible wherein the half select signals are counterbalanced, as for example the arrangement shown in FIG. 9, and the particular form of array shown in FIG. 7 or FIG. 9 is not to be considered limiting with respect to the printed circuit assembly shown hereafter.

Referring now to FIG. 9, a set of four cores 10 is shown as it appears finally assembled in the hardened plastic board 11 whereon four sets of four plated conducting lines or windings 12 are directed from one side or face of the board 11 to the other face in passing through the core openings 31. In the example illustrated, only four openings 31 are shown formed by a confining cross of webs of plastic in the board 11 to pass windings through the core, however, it is obvious that when desired a smaller or larger number of such openings may be formed, and such windings may be provided by the advanced form of process described herein. In FIG. 9 it is illustrated that all of the conducting lines 12 are formed all the way to notches 32 in the edge of the board 11 and there they may be receptive to terminal clamps or soldering connections and for such purposes, the line areas could be widened or restricted or formed to facilitate any of the well known forms of connections to printed circuit boards. The notches 32 are useful for aligning and stacking purposes whereby a plurality of boards such as board 11 may be stacked on common vertical rods or conductive bus bars.

Turning attention now to the manner in which the several magnetic cores 10 are arranged in accurately spaced horizontal and vertical rows in a finished board so that the plated windings thereon are properly directed over the board and through the core openings. Reference is made to the succession of molding process steps shown in FIGS. 1–6.

Figure 1:
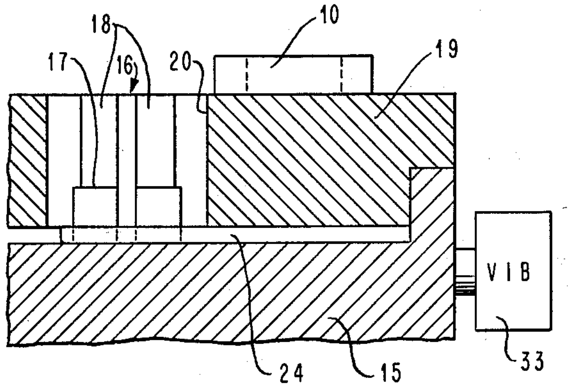
FIG. 1 is a sectional elevation view of a single core position to illustrate the first step in the molding operation. This view shows the bottom mold with an upwardly extending four pronged pin and a temporary mask plate associated therewith for presenting an annular opening for the reception of a core.

In FIG. 1 it is illustrated that a lower mold form or receptacle 15 is formed with an upwardly extending pin 16 which is one of a set of accurately spaced array of such pins. Each pin is formed with a lower shoulder 17 and comprises four segmental extensions 18 which are shaped to provide the final core openings 31 (FIG. 9) inside the annular outer frame of the core 10. In order to facilitate the setting of the cores 10 on the pins 16, FIG. 1, there is assembled over the lower mold 15, a temporary masking plate 19 which is formed with a series of openings 20 coinciding with the positions of pins 16, said openings 20 being of a slightly larger diameter than the outer diameter of the core 10. When a number of loose cores are deposited on top of the masking plate 19, the assembly of mold 15 and plate 19 is vibrated either by hand or automatically by a vibrator 33 and thereby serving to shake the supply of cores in various positions where one finally finds the opening 20 and drops through and comes to rest in the proper position around pin 16. In order to hold the cores in such an assembled position, perforations (not shown) may be provided to extend upwardly through the lower mold 15 and through the shoulder 17 of the pin 16 and be connected to a vacuum source of exhausted air in order to provide sufficient suction to hold the cores in position. Such suction openings are an optional feature and such openings may be closed or plugged before the plastic is injected into the closed mold.

Figure 2:
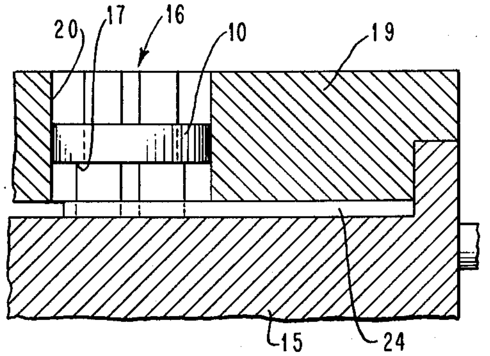
FIG. 2 shows the second step in the process wherein the core is assembled around the pin as confined by the temporary plate which is then removed.

FIG. 2 shows the condition of the parts of the process when the stage is reached wherein a core 10 is assembled on a pin 16 and before the temporary mask 19 is removed.

Figure 3:
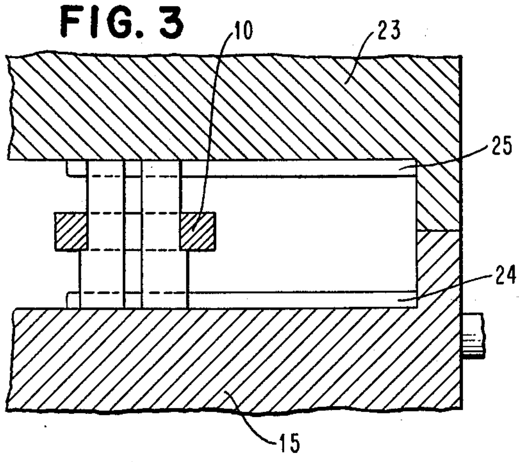
FIG. 3 shows the third step in the process wherein the upper mold plate is placed over the core and lower mold to provide the inwardly extending ribs and a central web-opening in readiness for the injection of the plastic potting compound.

Turning now to FIG. 3, it is seen that the temporary mask 19 has been removed and instead an upper mold plate 23 is assembled over the nested core 10 and over the bottom mold plate 15. In this sectional view, FIG. 3, it is seen that not only is the lower mold plate 15 formed with upwardly extending ribs or ridges 24 which run in directions terminating against one or the other of the four pin segments 18 but the upper mold plate 23 is similarly shaped with lowermost ribs 25, also extending inwardly towards the central plastic receiving area, said ribs 25 also running either between core pin segments 18 or from such segments to the edge of the mold. The abutting construction of these ribs 24, 25 and the segmental pin extensions 18 is such as to provide conductor channels in the plastic, said channels extending to and through the holes 31 which are to be formed inside the annular formation of the magnetic core 10.

At this point it may be mentioned that it is apparent that instead of cores 10 some other electronic components such as resistances, capacitors, inductances, semiconductors, etc. may be similarly encapsulated and have printed circuit lines, conductors and windings assembled therewith in a fashion taught by the present process.

Figure 4:
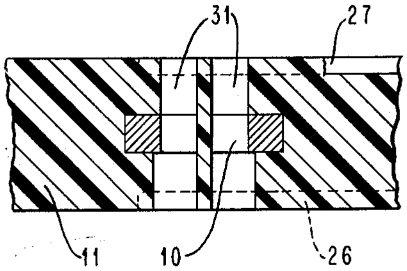
FIG. 4 shows the results of the step wherein the plastic material encapsulates the core and provides channels and openings through the core for reception of preliminary conductive coating material. This view illustrates the appearance of the plate after removal from the mold, i.e., after filling the closed mold of FIG. 3.

The mold 15, 23, FIG. 3, and core pin assembly is ready at the stage to receive the plastic material which is injected therein and results in the formation of the board 11, FIG. 4, containing core 10 and the necessary conductor channels 26, 27 and confining cross webs of plastic and the four holes, openings or perforations 31 in plastic through each large core center.

The plastic material 11 which is to be forced into the closed mold 15, 23 to embed or encapsulate the cores 10, may be of a wide variety of choice of thermoplastic or thermosetting materials applied with heat and pressure. Of course, the size of the core openings, channels, etc., and degree of miniaturization of the core array has some effect on the choice of plastic materials and levels of heat and pressure employed. For rather small assemblies, powders of the phenolic or epoxy molding compounds may be used, while acrylic materials or glass alkyd putty are other acceptable plastic materials. For larger sizes of cores and panels, a wide choice of plastic and ceramic insulation materials are suitable as a molded panel for the cores and the coils and wiring associated therewith.

It is understood that the molding die or outer casing 15, 23 is enclosed on all sides and formed with any well known form of injection plunger receiver and entry openings for the injection of the plastic material under pressure and with heat if necessary.

Turning now to FIG. 4, there is shown a section of a portion of the board 11 into which is assembled one of the cores 10, said board being cured and hardened and formed with the channels 26 and 27, the former resulting from the ribs 24 and the latter resulting from the ribs 25 extending inwardly in the mold when the plastic 11 is injected in a flowing condition while the mold sections are assembled as shown in FIG. 3.

FIG. 4 also shows in section that four holes, perforations, or openings 31 have been formed by the segmental pin extensions 18 which are withdrawn with the lower mold plate 15 when the plastic is in the final hardened condition. In FIG. 9 it is seen that the sector shaped holes 31 have arcuate walls aligned with the inner cylindrical wall of core 10. At this point it may be pointed out that since the plastic material to be used may be either thermosetting or thermoplastic in character and the condition in which it is initially used may be considered an uncured or semi-cured condition, hardening may proceed either without the application of heat or in some instances a certain amount of differentiation from room temperature may be necessary to facilitate the curing and hardening of the particular plastic used.

Figure 5:
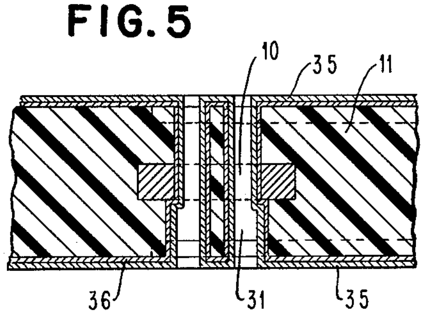
FIG. 5 shows the appearance of the encapsulated core and board after the complete conductive coating of a preliminary coat plus an electroplating operation whereby copper or some other metallic layer is deposited all over both sides of the board and into the channels or grooves, and also into the four openings extending through the core center and beyond the encapsulated core.

FIG. 5 illustrates the appearance of a portion of the core memory array after the application of a spray or deposit of a preliminary graphite layer or chemical conductive film 36 and the plating of conductive material 35 over all exposed areas of both surfaces of the board 11. It is to be understood that such exposed areas include the four openings 31 passing through the core 10 and it is into and onto all such areas that a preliminary coating of some conductive material such as graphite or chemically deposited metals such as copper, silver, or nickel may be made initially as the forerunner to the outer electroplating operation whereby any one of the well known forms of metallic electrolytes may be used with electrolytic action to deposit a permanent coating of metal 35 over the preliminary coating 36. Before the application of layer 36, a sprayed or brushed coat of adhesive may be applied for better bonding of conductor to plastic. Of course, it is apparent that in certain instances it may be possible to dispense with the electroplating operation and rely upon the deposits of conductive material which is chemically or mechanically deposited over all surfaces of the board 11, or only in those channel and opening areas. In any event, the board 11 is provided with conductive means finally resulting in a core array such as illustrated in FIGS. 7 and 9.

FIG. 6 shows the sectional elevation view of the board 11 after a grinding operation wherein two grindings disks are spaced apart the equivalent of the thickness of the formed board 11; said disks being operated as the board is directed therethrough with the result that the entire outer faces of conductive material 35, 36 are removed so that all that remains is the conductive material 12 in the channels 26 and 27 and through the openings 31 in the cores. The grinder may be in the form of a double disk grinder in order to simultaneously remove the copper coating from the top and bottom of the board and both of the surfaces of the core plane and thus leave only the desired channel circuitry in the upper and lower surfaces and through the four holes in the center of the core. The operation of grinding or coating removal should be carried further so that all conductive material will also be taken off the edges of the core plane to eliminate any chance of short circuitry by such peripheral conductors. It is of note that the deposited conductive material 37 in any one core opening 31, is connected only to its lines 12 and is distinct from conductors in other openings 31 unless connector ribs are deliberately formed otherwise.

FIG. 8 illustrates that upon testing a core plane, if it is found to have any imperfect cores, an economical remedy or correction is readily available as shown. A round section of plastic larger than the outside diameter of the core such as block 29 may be removed by utilizing a drill, punch, or a hollow milling cutter. A replacement is then effected by inserting a repair cylinder 30 which is prearranged with a perfect core 10 molded therein and circuitry 39 through the core and lines 40 and 41 in the upper and lower surfaces, identical to the section of the plane that was removed. After the repair cylinder 30 is put into place and correctly oriented, it may be cemented or soldered in place and thus the whole array is usable without being discarded because of a limited imperfection.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a magnetic memory device, the combination comprising a molded insulating support plate having a plurality of holes and channels connecting said holes, said holes having arcuate walls as part of a cylindrical wall, a plurality of toroidal cores with internal cylindrical walls, positioned around one or more of said holes and lying within said plate, below both surfaces of said plate and below the lowermost portions of said channels in said plate, said core walls being substantially aligned with said arcuate hole walls, and electrically conductive material in said channels and through said holes and over said core and hole walls to provide circuit patterns in the surfaces of said plate and extending through said holes so as to provide a winding circuit linking said cores.

2. An array of magnetic cores having windings formed with printed circuit conductors and comprising a plate of molded insulating material having a plurality of spaced perforations of regularly shaped wall surfaces and a plurality of channels in both plate faces, an array of cores embedded in said plate, said cores encircling one or more of said perforations, said cores conforming in internal wall surface shape therewith to provide portions of continuous inner wall surfaces with said perforation walls and in turn being traversed by one or more of said channels extending to said perforations, and having said printed circuit conductors in said channels and through said perforations and over said continuous inner wall surfaces, said conductors being connected through the perforations and cores and forming winding circuits for said cores.

3. In a magnetic memory device, the combination comprising a plate of molded insulation material having a plurality of hole areas, each such area having a plurality of openings in a group extending through said plate and channels terminating at said openings said channels extending between such openings or from such openings to the edge of said plate, each of said hole areas being bridged by a web of insulation material of said plate to define a plurality of said openings in a group, a plurality of toroidal magnetic cores arranged in a regular array and embedded within said plate with at least one of said hole areas being encircled by each of said toroidal magnetic cores, and electrically conductive material within said channels and through said openings to define windings and circuits linking groups of said cores.

4. In a magnetic memory device, an insulating support plate having a plurality of groups of perforations therethrough and a plurality of channels leading to and from said perforations, each of said groups of perforations being bridged by a cross of insulation material of said plate to separate said perforations of a group, a plurality of magnetic cores encapsulated in said plate and confined by said crosses of material, and electrically conductive material within said channels and connected to similar material in said perforations there being at least one of said perforations of a group extending through each of said cores and said support plate and providing electrically conductive regions interconnecting said conductive material in said channels to define series connected winding circuits linking groups of said cores.

5. In a magnetic memory device, the combination comprising a plurality of magnetic cores, a molded insulating support plate for said cores having a plurality of perforations in groups of four perforations per group and channels connecting said perforations, each of said groups of perforations being bridged by a cross of insulation material in said plate to define four sector shaped perforations with the arcuate outer walls of said perforations coinciding with the internal diameter of one of said magnetic cores, each of said cores being positioned around one of said groups of perforations and coinciding axially with the center of said group of perforations and lying within said plate below both surfaces of said plate and below the lowermost portions of said channels in said plate, and electrically conductive material in said channels and through said perforations and cores to provide circuit patterns in the surfaces of said plate and extending through said perforations to provide winding circuits linking said cores.

6. A repaired magnetic core array comprising a plurality of magnetic cores in an array with an inserted repair plug section, said array including a plate of insulation material formed with regularly spaced perforations and a plurality of channels extending between said perforations in both plate faces, said plate including said plug section surrounding one or more of said perforations, said plug section being of shaped and fitted repair insulation material with channel portions to complete the plate, said plate material around said perforations providing walls aligned with interior walls of said cores and providing access to said channels, said array of cores being embedded in said plate and plug, each of said cores encircling one or more of said perforations and being traversed by one or more of said channels extending to said perforations, and conductive lines in said channels and on said perforation and core walls to form winding circuits for said cores including the core in the plug section.

7. A magnetic core array repair plug element for a core having a cylindrical inner hole wall, comprising a regularly shaped insulation housing formed centrally with a hole area bridged by a cross of insulation material to define four sector shaped openings with said openings having arcuate walls as part of said sector opening and said arcuate walls being co-extensive with the diameter of said inner core wall, said core being completely embedded in said housing and truly encircling said four openings, said cylindrical core wall being continuous with said sector opening walls, a series of channels in said housing faces leading to said sector openings and to the edge of said housing, and a series of winding conductor lines in said channels and over the inner core wall and opening walls and extending to the edges of said housing, whereby said lines may be connected to related lines in an otherwise complete core array when said element is inserted in an array as a repair element.

References Cited by the Examiner

UNITED STATES PATENTS

| | | | |
|---|---|---|---|
| 2,823,373 | 2/58 | Consolvi | 340—174 |
| 2,825,891 | 3/58 | Duinker | 340—174 |
| 2,864,156 | 12/58 | Cardy | 29—155.5 |
| 2,878,463 | 3/59 | Austen | 29—155.5 |
| 2,901,736 | 8/59 | Sylvester | 340—174 |
| 2,910,675 | 10/59 | Gessner | 340—174 |
| 2,926,340 | 2/60 | Blain et al. | 340—174 |
| 2,934,748 | 4/60 | Steimen | 340—174 |
| 2,978,681 | 4/61 | Sims et al. | 340—174 |

IRVING L. SRAGOW, *Primary Examiner.*

EVERETT R. REYNOLDS, JOHN T. BURNS, *Examiners.*